(12) United States Patent
Boland

(10) Patent No.: US 11,273,797 B2
(45) Date of Patent: Mar. 15, 2022

(54) WINDSCREEN WIPER DEVICE

(71) Applicant: TRICO BELGIUM SA, Aubange (BE)

(72) Inventor: Xavier Boland, Arlon (BE)

(73) Assignee: TRICO BELGIUM S.A., Aubange (BE)

( * ) Notice: Subject to any disclaimer, the term of this patent is extended or adjusted under 35 U.S.C. 154(b) by 107 days.

(21) Appl. No.: 15/766,940

(22) PCT Filed: Oct. 14, 2015

(86) PCT No.: PCT/EP2015/073797
§ 371 (c)(1),
(2) Date: Apr. 9, 2018

(87) PCT Pub. No.: WO2017/063687
PCT Pub. Date: Apr. 20, 2017

(65) Prior Publication Data
US 2018/0297560 A1    Oct. 18, 2018

(51) Int. Cl.
*B60S 1/40* (2006.01)
*B60S 1/38* (2006.01)

(52) U.S. Cl.
CPC .......... *B60S 1/4087* (2013.01); *B60S 1/3849* (2013.01); *B60S 1/3855* (2013.01); *B60S 1/3858* (2013.01); *B60S 1/3851* (2013.01)

(58) Field of Classification Search
CPC .... B60S 1/3849; B60S 1/3855; B60S 1/3858; B60S 1/3851; B60S 1/4083; B60S 1/4087
(Continued)

(56) References Cited

U.S. PATENT DOCUMENTS

| 6,668,419 B1 * | 12/2003 | Kotlarski | B60S 1/38 |
| | | | 15/250.43 |
| 2011/0041280 A1 * | 2/2011 | Choi | B60S 1/3858 |
| | | | 15/250.361 |

(Continued)

FOREIGN PATENT DOCUMENTS

WO    02/42129    * 5/2002

OTHER PUBLICATIONS

Machine translation of description portion of WO publication 02/42129, published May 2002. (Year: 2002).*

(Continued)

*Primary Examiner* — Gary K. Graham
(74) *Attorney, Agent, or Firm* — Bryan Cave Leighton Paisner LLP

(57) ABSTRACT

A connecting device (6) is provided for interconnecting a windscreen wiper device (1) of the flat blade type and an oscillating arm (7) pivotally connectable to the connecting device about a pivot axis near one end thereof. The windscreen wiper device includes an elastic, elongated carrier element, as well as an elongated wiper blade (2) of a flexible material, which can be placed in abutment with a windscreen to be wiped. The wiper blade includes at least one groove (3), in which groove a longitudinal strip (4) of the carrier element is disposed. The connecting device is arranged to be connected to the longitudinal strip, and includes—at least one hole (19) of a first type arranged to allow a welding tool access through the hole of the first type to contact the longitudinal strip for welding the longitudinal strip and the connecting device together; and—at least one hole (20) of a second type arranged to allow a pin access through the hole of the second type and through the longitudinal strip for interconnecting the longitudinal strip and the connecting device.

9 Claims, 5 Drawing Sheets

(58) Field of Classification Search
USPC .......................... 15/250.32, 250.43, 250.201
See application file for complete search history.

(56) References Cited

U.S. PATENT DOCUMENTS

| | | |
|---|---|---|
| 2013/0091650 A1* | 4/2013 | Weidlich .................. B60S 1/40 15/250.32 |
| 2013/0326838 A1 | 12/2013 | Greunlinx et al. |
| 2014/0289990 A1 | 10/2014 | Boulanger |
| 2014/0325786 A1 | 11/2014 | Verelst et al. |

OTHER PUBLICATIONS

International Search Report, dated Jun. 20, 2016 (PCT/EP2015/073797).

\* cited by examiner

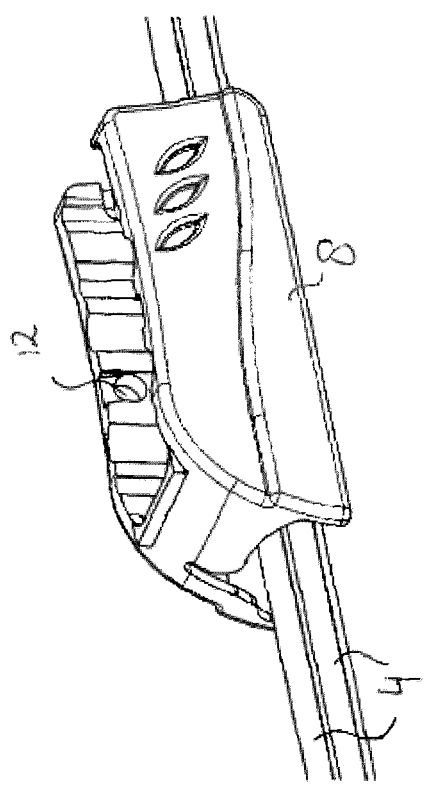
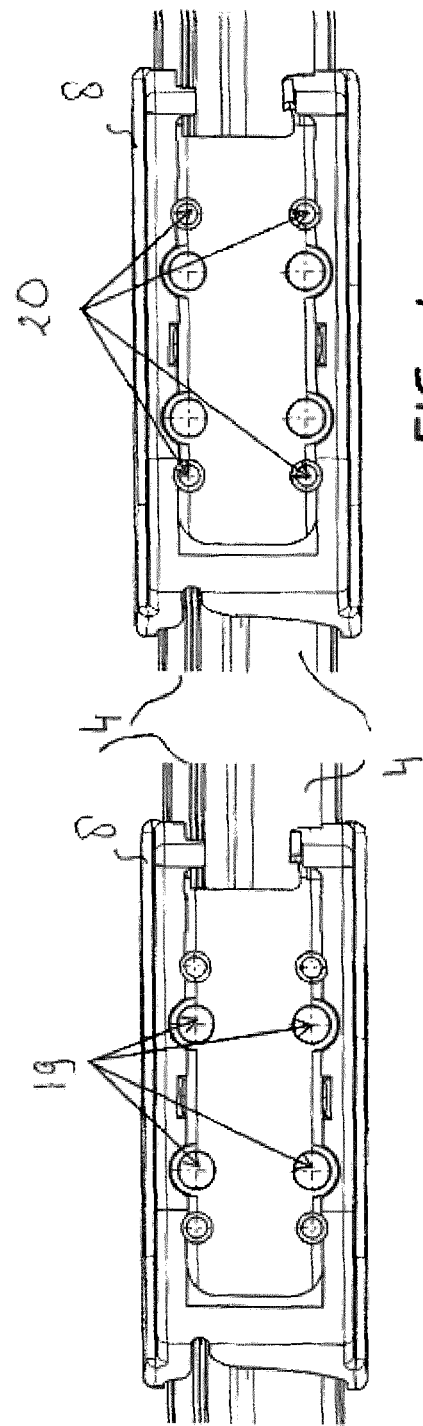
FIG. 4
FIG. 3

WINDSCREEN WIPER DEVICE

BACKGROUND

1. Technical Field

The present invention relates to a connecting device for interconnecting a windscreen wiper device of the flat blade type and an oscillating arm pivotally connectable to the connecting device about a pivot axis near one end thereof, wherein the windscreen wiper device comprises an elastic, elongated carrier element, as well as an elongated wiper blade of a flexible material, which can be placed in abutment with a windscreen to be wiped, which wiper blade includes at least one groove, in which groove a longitudinal strip of the carrier element is disposed.

Further, the present invention also relates to a windscreen wiper device of the flat blade type comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, which windscreen wiper device comprises the connecting device for an oscillating arm, wherein the oscillating arm can be pivotally connected to the connecting device about a pivot axis near one end thereof.

Finally, the present invention also refers to a method for manufacturing the windscreen wiper device.

The longitudinal strip is also called a "flexor", while the connecting device is also indicated as a "connector".

Preferably, the wiper blade comprises a spoiler at a side thereof facing away from the windscreen to be wiped. The spoiler is also called an "air deflector" and is preferably made in one piece with the wiper blade.

Preferably, ends of the longitudinal strip(s) are connected by a respective connecting piece, also called an "end cap".

In use, the oscillating arm is connected to a mounting head mounted on a drive shaft, wherein the oscillating arm at one end thereof is pivotally connected to the mounting head by means of a pivot pin and at another end thereof is connected to the wiper blade placed in abutment with the windscreen to be wiped. In use, the shaft rotates alternately in a clockwise and in a counter-clockwise sense carrying the mounting head into rotation also, which in turn draws the oscillating arm into rotation and by means of the connecting device moves the wiper blade, the oscillating arm can thus oscillate to-and-from between a first and second reversal positions.

It is noted that the present invention is not restricted to automobiles, but also refers to rail coaches and other (fast) vehicles.

Further, it is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade, the groove(s) may be closed at one outer end.

2. Related Art

Such a connecting device and such a windscreen wiper device are generally known. This prior art windscreen wiper device is designed as a "flat blade" or "yokeless blade", wherein no use is made of several yokes pivotally connected to each other, but wherein the wiper blade is biased by the carrier element, as a result of which it exhibits a specific curvature.

In practice it has become apparent that there is a need for a connecting device being more flexible in use and being able to withstand high forces exerted on the connection between the connecting device and the oscillating arm.

SUMMARY

The object or the invention is to provide an improved connecting device for interconnecting a windscreen wiper device of the flat blade type and an oscillating arm, wherein the connecting device has a broader use and is able to withstand high forces, using a minimum of parts.

Thereto, a connecting device of the type referred to in the introduction is characterized according to the invention in that the connecting device is arranged to be connected to the longitudinal strip, wherein the connecting device comprises at least one hole of a first type arranged to allow a welding tool through the hole of the first type to contact the longitudinal strip for welding the longitudinal strip and the connecting device together; and at least one hole of a second type arranged to allow a pin access through the hole of the second type and through the longitudinal strip for interconnecting the longitudinal strip and the connecting device.

Hence, a universal connecting device is obtained allowing connection to the longitudinal strip using a welding operation or a mechanical operation with the help of (a) pin(s), or both, dependent on the choice of an assembler, the welding tool is preferably an ultrasonic welding tool. More in particular, the welding tool is an electrode, for example an ultrasonic electrode.

Preferably, the connecting device is made of a polymer material, whereas the longitudinal strip is either made in one piece of a polymer material as well, or provided with a polymer skin, i.e. coating. In assembled position of the connecting device, the wiper blade and the longitudinal strip, making use of the welding operation with the help of a heated electrode accommodated in the hole of the first type, the polymer material of the connecting device and the longitudinal strip will locally melt, namely at a location of their interaction, ensuring a firm interconnection between them. Once the interconnection is established, the electrode will be retracted, so that a unit comprising of the connecting device, the wiper blade and the longitudinal strip is ready for use, i.e. is ready to be connected to an oscillating arm.

The hole of the first type or welding hole differs from the hole of the second type or pin hole in the sense that the hole of the first type is a blind hole, wherein the longitudinal strip rests on a bottom of the blind hole, the bottom is then the location of interaction between the connecting device and the longitudinal strip in case a welding operation is used, as explained above.

It is noted that that the term "welding" in the framework of the present invention also encompasses the term "soldering", wherein in the latter case a soldering material, preferably a polymer material as well, is locally applied between the connecting device and the longitudinal strip.

Instead of the welding operation or in addition to the welding operation, use is made of a mechanical interconnection between the connecting device and the longitudinal strip, with the help of one or more pin(s) extending perpendicular to the windscreen to be wiped. More in particular, the pin cooperates with a hole provided in the longitudinal strip in order to block any movement of the connecting device in longitudinal direction thereof relative to the longitudinal strip at the location of their interconnection. The pin is preferably movable, for example pressed by hand, from a first position, wherein the pin in a pre-mounted position may be fixed to the connecting device, into a second position, wherein the pin in a mounted position as a single constructional element is interconnecting the connecting device and the longitudinal strip. In other words, the pin ensures that the connecting device and the longitudinal strip are not allowed to mutually move.

In a preferred embodiment of a connecting device in accordance with the present invention the hole of the first type is a blind hole, wherein the hole of the second type is a through hole. In another preferred embodiment of a connecting device according to the present invention the connecting device comprises engaging members made integral therewith arranged to engage around longitudinal strips of the carrier element disposed in opposing grooves of the wiper blade, wherein the connecting device comprises at least one hole of the first type and at least one hole of the second type for each longitudinal strip. Particularly, the connecting device has a substantially U-shaped cross-section, wherein free ends of legs (forming the integral engaging members) of the U-shaped cross-section extend inwardly so as to form grooves for receiving longitudinal sides of the longitudinal strips, and wherein the free ends may be provided with guiding channels for guiding the pin.

In another preferred embodiment of a connecting device in accordance with the present invention the hole of the first type is open, i.e. accessible for the welding tool, from a top of the connecting device. The hole of the second type preferably is open, i.e. accessible for the pin, from a bottom of the connecting device.

In another preferred embodiment of a connecting device according to the present invention the connecting device comprises two pairs of holes of the first type, wherein each pair comprises opposing holes of the first type, and wherein each pair is located near an end wall of the connecting device. Preferably, the connecting device comprises two pairs of holes of the second type, wherein each pair comprises opposing holes of the second type, and wherein each pair is located near an end wall of the connecting device.

As indicated above, the present invention also refers to a windscreen wiper device of the flat blade type comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein the windscreen wiper device further comprises a connecting device in accordance with the present invention for pivotally connecting an oscillating arm to the connecting device about a pivot axis near one end thereof.

As indicated above, the present invention also refers to a method for manufacturing a windscreen wiper device comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, which windscreen wiper device comprises a connecting device for an oscillating arm, wherein the oscillating arm can be pivotally connected to the connecting device about a pivot axis near one end, with the special feature that the connecting device is connected to the longitudinal strip, wherein the connecting device is provided with at least one hole of a first type arranged to allow a welding tool access through the hole of the first type to contact the longitudinal strip for welding the longitudinal strip and the connecting device together; and at least one hole of a second type arranged to allow a pin access through the hole of the second type and through the longitudinal strip for interconnecting the longitudinal strip and the connecting device.

THE DRAWINGS

The invention will now be explained in more detail with reference to figures illustrated in a drawing, wherein FIG. 1 is a schematic and perspective view, partly in exploded view, of a main part of a windscreen wiper device and an oscillating arm according to the invention, wherein a first part and a second part of a connecting device of the windscreen wiper device is shown arranged to be connected to the oscillating arm;

FIGS. 3 and 4 are a schematic and perspective view of the first part of the connecting device of FIG. 1 mounted on the wiper blade, as well bottoms views thereof;

DETAILED DESCRIPTION

Figure 1:
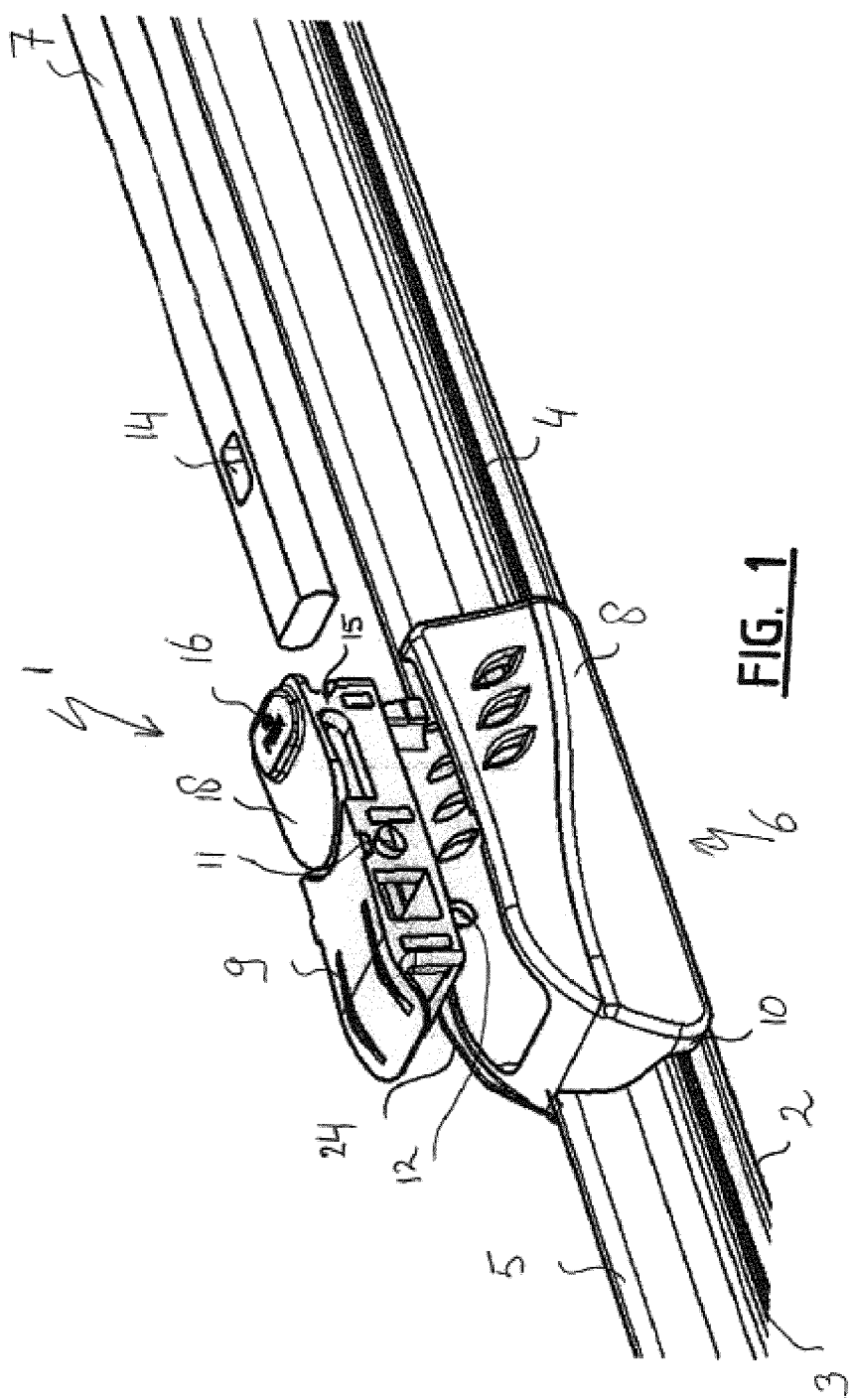

FIG. 1 shows a windscreen wiper device 1 of the "flat blade" type according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3, the strips 4 form a flexible carrier element for the rubber wiper blade 2, as it were, which is thus biased in a curved position (the curvature in operative position being that of a windscreen to be wiped). Neighbouring ends of strips 4 are interconnected on either side of the windscreen wiper device 1 by means of connecting pieces or "end caps" (not shown) functioning as clamping members. In this embodiment, the connecting pieces may be separate constructional elements, which may be form-locked ("positive locking" or "having positive fit"), as well as force-locked to the ends of strips 4. In another preferred variant, the connecting pieces are in one piece with the strips 4 made of spring band steel. In the latter case the connecting pieces form transverse bridges for the strips 4, as it were. Possibly, a spoiler 5 is furthermore provided.

The windscreen wiper device 1 is furthermore built up of a connecting device 6 of plastic material for an oscillating wiper arm 7, the wiper arm 7 is finalized by a rod-like extension (without an adapter). Connecting device 6 consists of a first part 8 and a second part 9 detachably connected together. The first part 8 is retained onto the wiper blade 2, whereas the second part 9 is positioned within the first part 8, that is between parallel, upright wails thereof. Further, the first part 8 comprises clamping members 10 that are integral therewith, which engage round longitudinal sides of the strips 4 that face away from each other, as a result of which the connecting device 6 is firmly attached to the unit consisting of wiper blade 2 and strips 4. The second part 9 has a U-shaped cross-section at the location of its connection to the first part 8. The oscillating wiper arm 7 is pivotally connected to the connecting device 6 about a pivot axis near a free end thereof, and that in the following manner.

Figure 2:
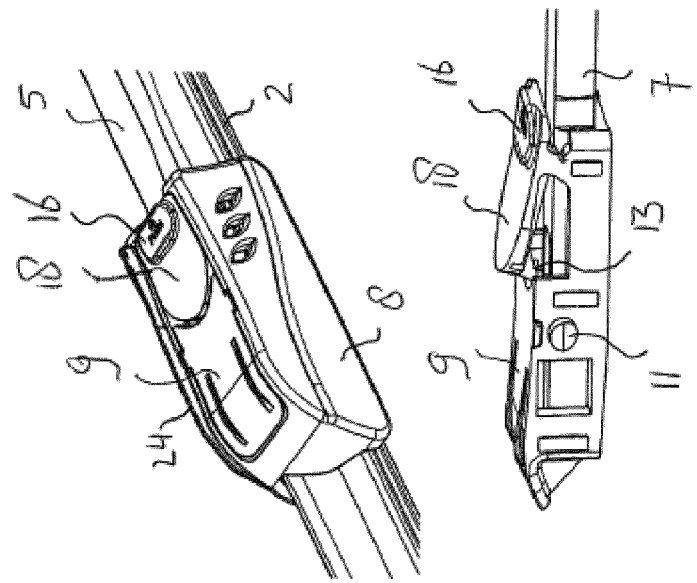
FIG. 2 are side views (on the left side) and schematic, perspective views (on the right side) of the oscillating arm inserted inside the second part of the connecting device of FIG. 1.
Figure 2:
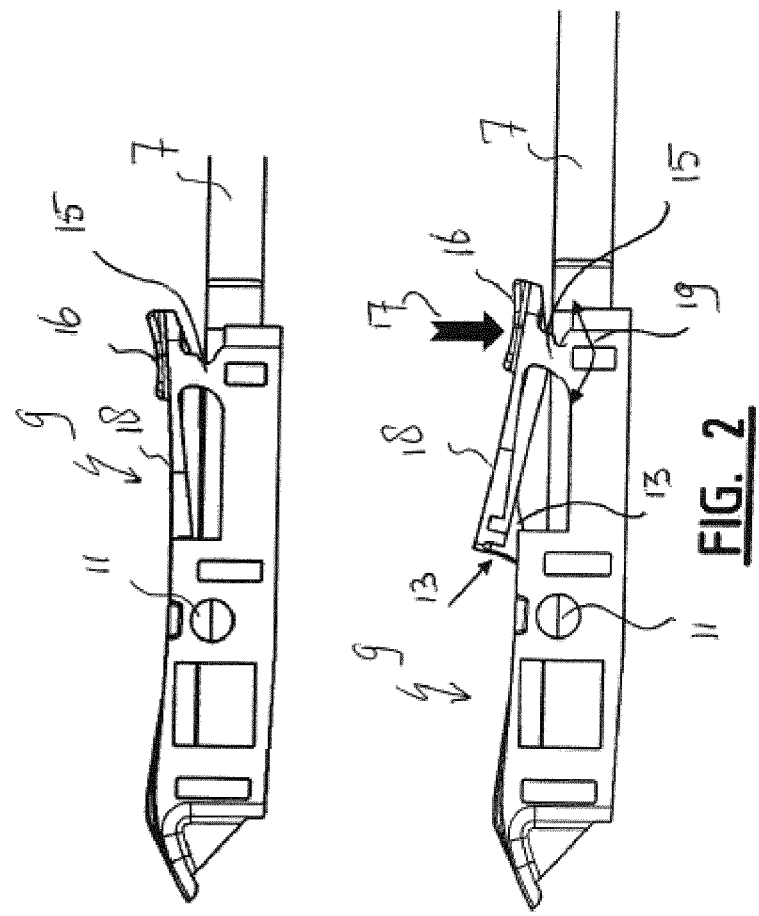

With reference to FIG. 2, the second part 9 comprises two cylindrical protrusions 11 (only one is visible) extending outwards on either side of the second part 9, that is on each vertical side wall of its U-shaped, rectangular or square cross-section. These protrusions pivotally engage in identically shaped cylindrical holes 12 (only one thereof is visible in FIG. 1) of the first part 8, the protrusions 11 act as bearing surfaces at the location of a pivot axis in order to pivot the second part 9 (and the oscillating wiper arm 7 attached thereto) about the pivot axis near a free end of the arm 7. The protrusions 11 are preferably in one piece with the second part 9. In the alternative, the protrusions 11 are part of a single pivot pin perpendicular to the connecting device 6.

Referring to FIGS. 1 and 2, the second part 9 comprises a protrusion 13 extending downwardly from a top wall of the second part 9, while the oscillating arm 7 has an identically shaped hole 14 with a closed circumference at the location of its connection to the second part 9, the protrusion is hingeable between an inward position (the top of FIG. 2), wherein in a mounted position the protrusion 13 engages into the hole 14 provided in the oscillating arm 7 in order to retain the connecting device 6 onto the oscillating arm 7, and an outward position (the bottom of FIG. 2), wherein in a dismounted position the protrusion 13 disengages from the hole 14 provided in the oscillating arm 7, allowing the connecting device 6 to be released from the oscillating arm 3. As shown, the protrusion 13 is hingeable along two lateral hinges 15 located near an outer edge of the second part 9 and on opposite sides of the oscillating arm 7, upon activating a push button 16 on the second part 9 by hand in the direction of arrow 17. More in particular, a part 18 of the top wall of the second part 9 is hingeable about the hinges 15, wherein the push button 16 is located at a top side of the part 18 near one end thereof, and wherein the protrusion 13 is located at a bottom side of the part 18 near an opposite end thereof. By activating or deactivating the push button 16, a hinge movement in the direction of arrows 19 is obtained. The movement is a so-called seesaw movement, the hinges 15 are invisible from the outside when the first and second parts 8,9 are interconnected.

In FIG. 3 at the top corresponding parts have been designated with the same reference numerals. In FIG. 3 at the bottom two pairs of blind holes 19 (left) and two through holes 20 (right) are depicted, the function of which will be explained hereunder.

Figure 5:
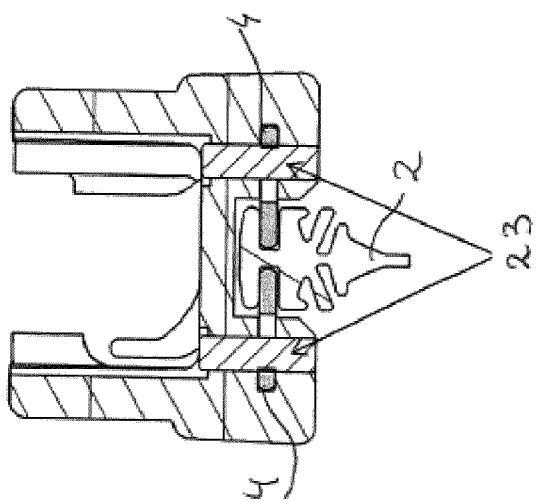
FIG. 5 is a cross-sectional view, at the location of the connection device, of a windscreen wiper device of FIG. 1, wherein use is made of pins to interconnect the connection device and longitudinal strips.
Figure 5:
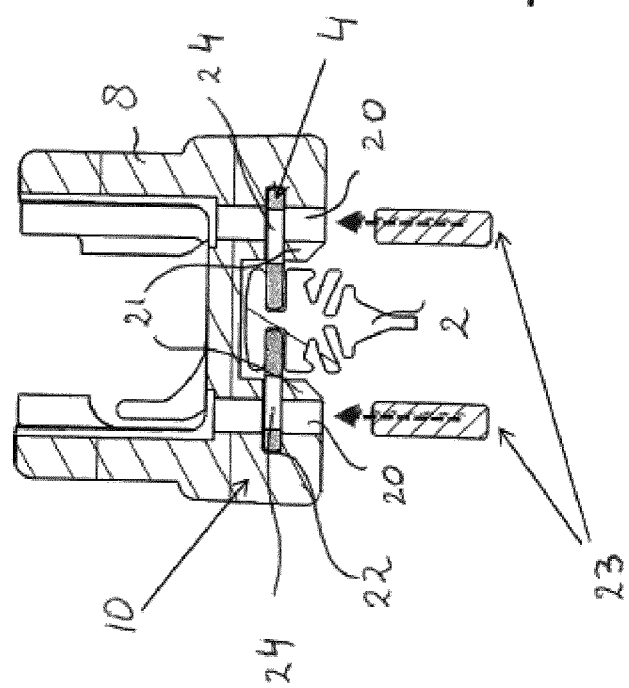

With reference to FIG. 5 the first part 8 of this connecting device 6 has a more or less U-shaped cross-section with legs forming the clamping members 10. Free ends 21 of the legs of the U-shaped cross-section extend inwardly so as to form grooves or slits 22 for receiving longitudinal sides of the longitudinal strips 4. The free ends 21 are provided with the through holes 20 for receiving four pins 23. Each longitudinal strip 4, as shown in FIG. 5, is provided with corresponding holes 24 cooperating with the corresponding pins 23. The holes 24 are made through a stamping operation in order to accurately control the shape of the holes 24. The pins 23 ensure that any longitudinal movement of the part 8 relative to the longitudinal strips 4 is blocked, the pins 23 can be pressed from a first position (FIG. 5 on the left), wherein the pins 23 may be separate (loose) constructional elements or in a pre-mounted position are fixed to the connecting device 6, into a second position (FIG. 5 on the right), wherein the pins 23 in a mounted position as single constructional elements are interconnecting the connecting device 6 and the longitudinal strips 4. The pins 23 can be pressed manually from the first position into the second position.

Figure 6:
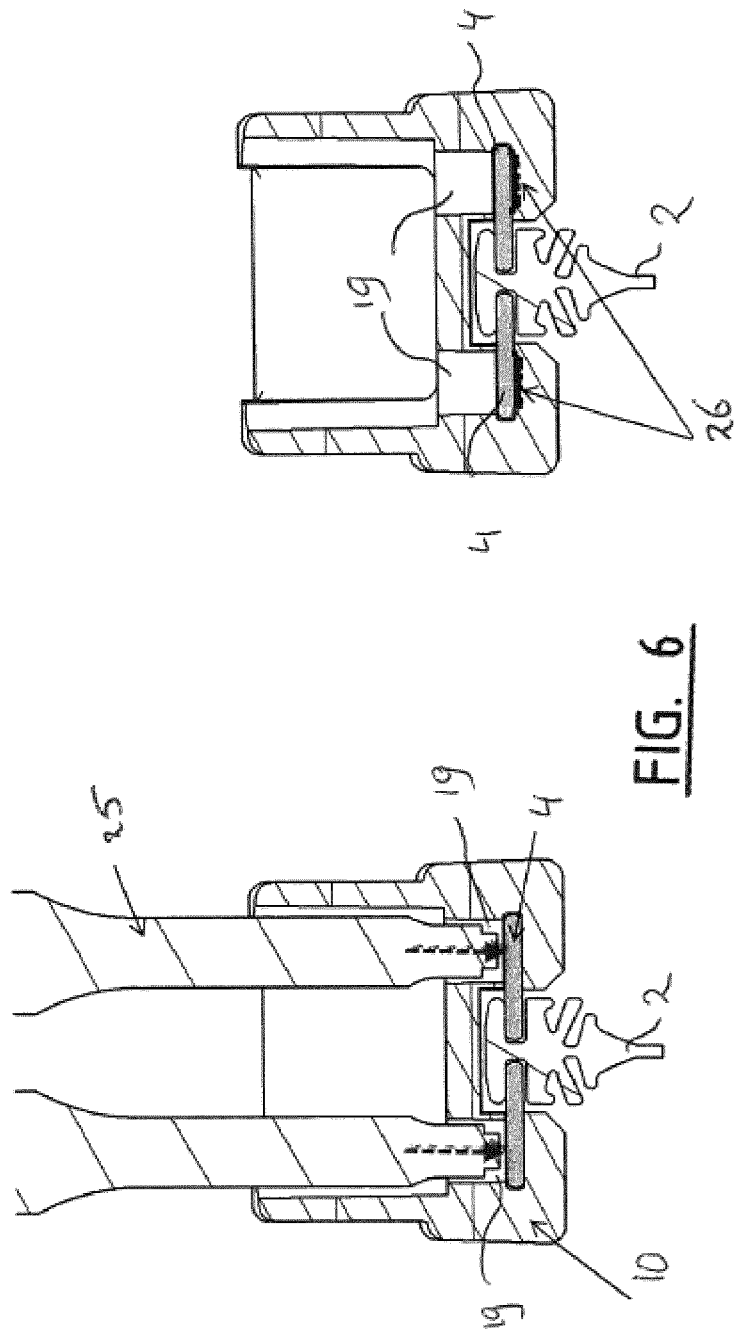
FIG. 6 corresponds to FIG. 6, on the understanding that now use is made or a welding operation.

With reference to FIG. 6 with the help of two electrically heated electrodes 25 accommodated in the holes of the connecting device 6, the polymer material of the connecting device 6 and the longitudinal strips 4 will locally melt together, namely at a location 26 of their interaction, ensuring a firm interconnection between them. Once the interconnection is established, the electrodes 25 will be retracted, so that a unit comprising of the connecting device 6, the wiper blade 2 and the longitudinal strips 4 is ready for use.

The invention is not restricted to the variants shown in the drawing, but it also extends to other embodiments that fall within the scope of the appended claims.

The invention claimed is:

1. A windscreen wiper device comprising an elastic, elongated carrier element and an elongated wiper blade of a flexible material, which can be placed in abutment with a windscreen to be wiped, which wiper blade includes at least one groove, in which at least one groove a longitudinal strip of said carrier element is disposed, said windscreen wiper device further comprising:
    a connecting device for interconnecting said windscreen wiper device and an oscillating arm pivotally connectable to said connecting device about a pivot axis near one end thereof, wherein said connecting device includes two pairs of blind holes and two pairs of through holes, wherein each pair of blind holes aligns with each pair of through holes along a longitudinal axis of said connecting device, and wherein said pair of through holes is separated by said pair of blind holes, wherein each blind hole is arranged to allow a welding tool access through said blind hole to contact said longitudinal strip for welding said longitudinal strip and said connecting device together, wherein each through hole is open from a bottom of said connecting device, wherein said connecting device has a U-shaped cross section with free ends of legs of said U-shaped cross section extending inwardly so that one of said free ends receives a longitudinal side of said longitudinal strip; and
    four pins, wherein each pin cooperates with one of said through holes and a corresponding hole in said longitudinal strip, wherein each pin interconnects said longitudinal strip and said connecting device to block longitudinal movement of said connecting device relative to said longitudinal strip.

2. The windscreen wiper device according to claim 1, wherein each pair of blind holes comprises opposing blind holes, wherein each pair of blind holes is located near an end wall of said connecting device.

3. The windscreen wiper device according to claim 1, wherein each pair of through holes comprises opposing through holes, wherein each pair of through holes is located near an end wall of said connecting device.

4. The windscreen wiper device according to claim 1, wherein each of said blind holes is open from a top of said connecting device.

5. A windscreen wiper device comprising:
    an elastic, elongated carrier element;
    an elongated wiper blade of a flexible material, which can be placed in abutment with a windscreen to be wiped, wherein said wiper blade includes at least one groove in which a longitudinal strip of said carrier element is disposed;
a connecting device comprising:
two pairs of blind holes, wherein a portion of each of said blind holes is welded to said longitudinal strip; and
two pairs of through holes open from a bottom of said connecting device,
wherein each pair of blind holes aligns with each pair of through holes along a longitudinal axis of said connecting device, and wherein said pair of through holes is separated by said pair of blind holes; and
four pins, wherein each pin cooperates with one of said through holes and a corresponding hole in said longitudinal strip, wherein each pin interconnects said longitudinal strip and said connecting device to block longitudinal movement of said connecting device relative to said longitudinal strip.

6. The windscreen wiper device according to claim 5, wherein said connecting device comprises engaging members made integral therewith arranged to engage around longitudinal sides of said longitudinal strip disposed in opposing grooves of said wiper blade.

7. The windscreen wiper device according to claim 5, wherein each pair of blind holes comprises opposing blind holes, wherein each pair of blind holes is located near an end wall of said connecting device.

8. The windscreen wiper device according to claim 5, wherein each pair of through holes comprises opposing through holes, wherein each pair of through holes is located near an end wall of said connecting device.

9. The windscreen wiper device according to claim 5, wherein each of said blind holes is open from a top of said connecting device.

* * * * *